United States Patent
Zavalij et al.

(10) Patent No.: US 11,933,747 B2
(45) Date of Patent: Mar. 19, 2024

(54) SYSTEM AND METHOD FOR IN-SITU X-RAY DIFFRACTION-BASED REAL-TIME MONITORING OF MICROSTRUCTURE PROPERTIES OF PRINTING OBJECTS

(71) Applicants: UNIVERSITY OF MARYLAND, COLLEGE PARK, College Park, MD (US); ADVANCED ANALYZER LABS, INC., Ellicott City, MD (US)

(72) Inventors: Peter Zavalij, Olney, MD (US); Huapeng Huang, Ellicott City, MD (US); Lester W. Schultheis, Sykesville, MD (US)

(73) Assignees: University of Maryland, College Park, College Park, MD (US); Advanced Analyzer Labs., Inc., Ellicott City, MD (US)

( * ) Notice: Subject to any disclaimer, the term of this patent is extended or adjusted under 35 U.S.C. 154(b) by 1066 days.

(21) Appl. No.: 16/625,307

(22) PCT Filed: Jun. 28, 2018

(86) PCT No.: PCT/US2018/039969
§ 371 (c)(1),
(2) Date: Dec. 20, 2019

(87) PCT Pub. No.: WO2019/006102
PCT Pub. Date: Jan. 3, 2019

(65) Prior Publication Data
US 2023/0194445 A1 Jun. 22, 2023

Related U.S. Application Data

(60) Provisional application No. 62/526,185, filed on Jun. 28, 2017.

(51) Int. Cl.
*G01N 23/207* (2018.01)
*B33Y 30/00* (2015.01)
(Continued)

(52) U.S. Cl.
CPC ............ *G01N 23/207* (2013.01); *B33Y 30/00* (2014.12); *G01N 23/20008* (2013.01);
(Continued)

(58) Field of Classification Search
None
See application file for complete search history.

(56) References Cited

U.S. PATENT DOCUMENTS 5,155,751 A * 10/1992 Chohata .................... C23C 2/28
378/70
6,731,719 B2 5/2004 Fewster et al.
(Continued)

FOREIGN PATENT DOCUMENTS

WO 2016094827 A1 6/2016

OTHER PUBLICATIONS

International Search Report Issued in Application No. PCT/US2018/039969.

*Primary Examiner* — Thomas R Artman
(74) *Attorney, Agent, or Firm* — ROSENBERG, KLEIN & LEE

(57) ABSTRACT

The system for in-situ real-time measurements of microstructure properties of 3D-printing objects during 3-D printing processes. An intensive parallel X-ray beam (with an adjustable beam size) impinges on a printing object and is diffracted on a crystal lattice of the printing material. The diffracted radiation impinges on a reflector formed with an array of reflector crystals mounted on an arcuated substrate. The diffracted beams reflected from the reflector crystals correspond to the diffraction intensity peaks produced by
(Continued)

interaction of the crystal lattice of the printing material with the impinging X-ray beam. The intensities of the diffraction peaks are observed by detectors which produce corresponding output signals, which are processed to provide critical information on the crystal phase composition, which is closely related to the defects and performance of the printing objects. The subject in-situ technology provides an effective and efficient way to monitor, in real-time, the quality of 3D-printing parts during the 3-D printing process, with a significant potential for effective process control based on the reliable microstructure feedback.

18 Claims, 8 Drawing Sheets

(51) Int. Cl.
*G01N 23/20008* (2018.01)
*G01N 23/2055* (2018.01)

(52) U.S. Cl.
CPC . *G01N 23/2055* (2013.01); *G01N 2223/0566* (2013.01); *G01N 2223/1016* (2013.01); *G01N 2223/303* (2013.01); *G01N 2223/306* (2013.01); *G01N 2223/503* (2013.01); *G01N 2223/605* (2013.01); *G01N 2223/606* (2013.01); *G01N 2223/611* (2013.01); *G01N 2223/645* (2013.01); *G01N 2223/646* (2013.01); *G01N 2223/6462* (2013.01)

(56) References Cited

U.S. PATENT DOCUMENTS

| | | | | |
|---|---|---|---|---|
| 6,821,361 | B2* | 11/2004 | Fujimura | G01N 33/208 |
| | | | | 148/508 |
| 7,236,566 | B2 | 6/2007 | Gibson et al. | |
| 7,801,272 | B2* | 9/2010 | Toraya | G01N 23/207 |
| | | | | 378/85 |
| 8,340,248 | B2* | 12/2012 | Toraya | B82Y 10/00 |
| | | | | 378/85 |
| 8,537,967 | B2* | 9/2013 | Seidler | G01N 23/2076 |
| | | | | 378/45 |
| 8,908,830 | B2 | 12/2014 | Omote et al. | |
| 9,417,197 | B2* | 8/2016 | Nakazawa | C23C 2/28 |
| 10,994,256 | B2* | 5/2021 | Xiang | C40B 60/06 |
| 2002/0075995 | A1* | 6/2002 | Fewster | G01N 23/20 |
| | | | | 378/81 |
| 2002/0174918 | A1* | 11/2002 | Fujimura | G01N 33/208 |
| | | | | 148/508 |
| 2004/0228441 | A1* | 11/2004 | Fewster | G01N 23/20 |
| | | | | 378/84 |
| 2006/0140343 | A1* | 6/2006 | Gibson | G01N 23/20 |
| | | | | 378/71 |
| 2009/0086921 | A1* | 4/2009 | Toraya | G01N 23/207 |
| | | | | 378/145 |
| 2010/0246768 | A1* | 9/2010 | Toraya | B82Y 10/00 |
| | | | | 378/83 |
| 2011/0058652 | A1* | 3/2011 | Seidler | B82Y 10/00 |
| | | | | 250/311 |
| 2012/0087473 | A1* | 4/2012 | Omote | G01B 15/04 |
| | | | | 378/86 |
| 2015/0055756 | A1* | 2/2015 | Nakazawa | C23C 2/28 |
| | | | | 378/71 |
| 2018/0185810 | A1* | 7/2018 | Xiang | C40B 60/06 |
| 2021/0197255 | A1* | 7/2021 | Ma | B22D 39/06 |
| 2023/0194445 | A1* | 6/2023 | Zavalij | G01N 23/2055 |
| | | | | 378/73 |

* cited by examiner

SYSTEM AND METHOD FOR IN-SITU X-RAY DIFFRACTION-BASED REAL-TIME MONITORING OF MICROSTRUCTURE PROPERTIES OF PRINTING OBJECTS

REFERENCE TO RELATED PATENT APPLICATIONS

This Utility patent application is based on the Provisional Patent Application No. 62/526,185, filed on 28 Jun. 2017.

FIELD OF THE INVENTION

The present invention is directed to a real-time quality monitoring of additive manufacturing processes, and, in particular, to an X-ray diffraction (XRD)-based system and method adapted for in-situ real time measurements of various microstructure properties of printing materials during additive manufacturing processes.

The present invention is further directed to a quality monitoring and control system which uses X-ray diffraction (XRD) principles for obtaining real-time measurements of printing materials properties during the additive manufacturing, such as, for example, metal 3-D printing.

The present invention also addresses real-time detection of possible defects in 3-D printed objects, based on measurements of the printing object's microstructure properties, such as the crystal phase composition, texture, crystal lattice structure, wafer penetration, crystal/amorphous structure, etc.

The present invention is further directed to an innovative in-situ technology that provides an effective monitoring of the quality of 3-D printing objects during the printing process with a significant potential for the manufacturing process control based on the real-time reliable microstructure properties feedback which can be used to adjust control parameters of the additive process.

In addition, the subject invention addresses in-situ real-time analysis of the structure and parameters of added layers of printing materials during the additive manufacturing process, performed by the subject quality control system which is capable of deep penetration into the 3-D printing object (exceeding the thickness of a top manufactured layer of the printing object) to acquire a comprehensive information for quality control of a polymer 3-D printing object which is not limited to a surface or upper layer measurements.

The present invention is also directed to an in-situ XRD-based system and method adapted for real-time measurements and analysis of various microstructure properties of printed materials, including, but not limited to, crystal phase composition, texture, crystal lattice structure, etc., for a broad range of materials, including, but not limited to, metals, semiconductors, polymers, nanomaterials, etc., performed during the printing process.

The present invention is further directed to in-situ XRD-based composition measurements capable of producing a real-time result which is achieved by taking advantages of an intensive X-ray beam having a parallel geometry impinging on a sample under study (printing object) during the 3-D printing process where the size of the parallel X-ray beam can be adjusted to suit purposes of the study and depending on the size of a feature under study, and is controllably scanned over the sample under study to provide a comprehensive analysis of the 3-D volume of the sample under test.

In addition, the present system is directed to a method and system for XRD-based microstructure properties measurements and analysis performed during the 3-D printing process which uses an array of thin reflecting crystals mounted on a curved substrate and located at a predetermined relative disposition with respect to the object under study, so that the array of the crystals can capture and reflect multiple useful signals (intensity peaks) diffracted from the sample (printing object) under study in various directions covering substantially a 360° area of diffraction rings, corresponding to the microstructure properties of the sample under study, which are subsequently quantified by a data acquisition system for further processing and analysis, thus attaining an increased efficiency of the measurements and comprehensive quality monitoring of a 3-D printing object.

The present invention is especially directed to a system and method for XRD-based real-time measurements of a crystal phase composition during the 3-D printing process which, by use of crystal reflectors, significantly reduces adverse influence from the scattering (noise) X-rays and fluorescence X-rays, thus attaining a substantially improved signal-noise ratio of the measurement process.

Moreover, the present invention is directed to the in-situ real-time XRD analyzer of various microstructure properties measurements for additive manufacturing which uses a parallel X-ray scannable incident beam with an adjusted beam size originating from a compact, low power X-ray source combined with an advanced collimating X-ray optic, and a unique reflection unit, which is displaced (along with a detector of diffracted X-rays) in synchronism and in accord with the impinging parallel X-ray beam, which enables a flexible real-time phase measurement configuration, improves measurement efficiency reliability and preciseness, and is capable of generating, in real-time, a comprehensive analysis result for the printing object quality, which can be feedback, in real-time, to the 3-D printer to adjust the 3-D printing process control parameters (if needed) to in-situ correct (or prevent) deficiencies and to provide high quality of the 3-D printing objects.

BACKGROUND OF THE INVENTION

Unlike conventional manufacturing processes that produce parts by removing unwanted material from a larger piece, 3D-Printing processes build parts by successively adding material layer by layer, i.e., one thin layer at a time. 3D-printing manufacturing is capable of producing complex, customized high-value parts (objects) from various materials with complex interior structures (that cannot be fabricated with traditional material removal processes) for use in high-stress, mission-critical applications, and thus can revolutionize the manufacturing industry.

During the 3-D printing, objects of almost any shape and geometry, are typically produced from a 3-D model (or another electronic data source), such as, for example, CAD (Computer-Aided Design) or AMF (Additive Manufacturing File), by successively adding material (liquid molecules, powder grains, etc.) layer by layer, and solidifying them (fusing the molecules or grains together) by applying radiation (electron, laser, etc.) in a controlled fashion.

However, a widespread realization of the full benefits of 3D-Printing across the manufacturing industry has not been reached at this time. This is due in part to a lack of 3D-Printing-specific methods for testing the raw material (for example, a powder) used as input materials (pre-process), parts during process (in-process), and the quality properties of the finished parts (post-process).

Crystalline phase composition is critical to the quality of metal 3D printing parts. Prevalent deviations of the phase composition during the manufacturing process usually bring an adverse impact to the performance and quality of the manufactured parts. Although these deviations sometime can be corrected by post production treatments, in many cases, it is impossible to meet the quality specifications after the process has been finished, and thus, for 3-D printing parts of a complex geometry, post-process quality control can be limited. Thus, proper Non-Destructive-Testing (NDT) real-time methods and implementation of in-situ sensing technology for feedback control to achieve product acceptance and repeatable production capability is imperatively needed for 3D-Printing applications.

An in-situ XRD composition quality monitoring system capable of measuring, analyzing and providing critical real-time microstructure information during the printing process is paramount for success of 3-D printing industry. Such system can enable 3D-printing industry to gain better process understanding and to monitor the quality of 3D-printing parts in real time (during the manufacturing process), which is to be used for providing critical and reliable feedback to achieve effective process control.

The market for 3-D printing is extraordinary and includes the aerospace industry, consumer products, healthcare, government and defense, industrial/business machines, education and research, and others (arts, architecture, forensics, etc.). Reliable quality assurance and effective quality/process control are needed for most of these applications.

Major 3-D-Printing companies around the world aim to attain high-performance and high-value 3-D-Printing systems. One of their significant efforts is to improve the quality control of the printing parts through developing, and using effective technologies capable of real-time in-situ monitoring of quality parameters of 3-D printing parts (objects).

Typical conventional XRD systems usually are equipped with a high power (from several hundreds of Watts up to 18 Kilowatts) X-ray source integrated with a dedicated cooling system, an expensive X-ray imaging detector (or a point detector) with a complicated alignment and scanning mechanism. A precise sample handling system is also used in conventional XRD systems. All these system components are necessary for the general purpose of XRD applications, such as to solve or identify the structures of unknown samples, or to measure samples with only miniscule amounts of material available for analysis. In the meantime, the system measurement efficiency and portability has been seriously limited or prohibited.

The requirements for the real-time XRD-based systems capable of monitoring the quality of a product are different from and more challenging than the general purposes of the conventional XRD systems. A successful development of an in-situ XRD-based analyzer for manufacturing processes is described in U.S. Pat. No. 7,236,566. This prior art system uses X-ray source and detectors disposed at fixed angular positions. It has demonstrated some feasibilities for applications in real-time quality assurance for steel production.

As shown in FIG. 1, the prior system described in the '566 patent uses a fixed positioning of the X-ray source and detectors during the manufacturing process. Angular filters (Soller slits) are used to measure a fixed area. Such arrangement is limited to an amount of captured signals (as low as several angular degrees of the diffraction ring), thus clearly limiting the efficiency of measurements. The prior systems thus do not attain a comprehensiveness of measurements required for effective quality control and do not permit users to adjust the size and position of the area of interest.

It is therefore highly desirable to provide a flexible XRD-based quality monitoring system allowing for adjustment size and position of the area of interest on the sample under study, as well as to provide acquisition of useful signals over the entire (360°) angular region of diffraction rings emanating from the sample under study, thus resulting in efficient, precise, comprehensive, and real-time measurements of microstructure properties of a 3-D printing object during the manufacturing process which is not limited to a narrow angular region of intensity peaks measurements. In addition, it would be highly desirable to prevent the adverse influence from scattering X-rays and fluorescent X-rays which is detrimental to the XRD-based measurements, especially those with metal samples.

SUMMARY OF THE INVENTION

It is therefore an object of the present invention to provide in-situ, real-time comprehensive highly efficient and accurate measurements of the microstructure properties of 3D-printing objects based on X-ray diffraction (XRD) principles during a 3-D printing process, with a sufficient precision, accuracy, and flexibility.

It is another object of the present invention to provide a system having robust measurements that increase comprehensiveness of the assay, by the use of an intensive X-ray collimated beam of a parallel beam geometry having an adjustable beam size and is capable of displacement relative the sample under study at a predetermined trajectory in precise synchronization with reflector and detector systems, and capable of certain penetration in the 3-D printing object for precise measurements of microstructural properties (for example, phase composition, texture, crystallographic lattice structure, crystallinity/amorphous ratio, water penetration, etc.) not only on the surface (top) printing layer, but also beneath the printed upper layer of the 3-D printing object.

It is still a further object of the present invention to provide an in-situ XRD analyzer system and method adapted for measurement of various microstructure properties of deposited materials of 3D-printing objects concurrently with each layer being fabricated in the 3-D printing process by using a size-adjustable scannable parallel incident X-ray beam and detectors cooperating with an array of reflector crystals of a predetermined configuration spaced apart in a predetermined fashion relative to the printing object and capable of selecting various diffraction intensity peaks for capturing and processing substantially an entire angular region of diffraction ring(s), and where the real-time ratio of the captured signals from at least two detectors' counts is interpreted to determine the phase composition of a printing layer.

It is further an object of the present invention to provide an innovative XRD-based analyzer which uses a size-adjustable incident parallel X-ray beam, multiple point detectors, and an array of reflecting crystals mounted on curved substrates of a predetermined profile and configuration (to select numerous diffraction intensity peaks and acquire useful signals from substantially full region of diffraction ring(s) emanating from the printing object) to improve the counting rate and to reduce the scattering noise detrimental to XRD measurements.

In one aspect, the subject invention addresses an X-ray diffraction system for real-time in-situ measurement of microstructural properties of a material of an object during 3-D printing process. The subject system is applicable to measurements of a physical object manufactured from a 3-dimensional (3-D) digital model by depositing a number of layers of a material in succession.

The subject system includes a low-power source of X-ray radiation, and a collimating sub-system operatively coupled to the X-ray radiation generated by the source. The collimating sub-system is configured with a collimating optic interacting with the X-ray radiation and capable of producing a size-adjustable parallel X-ray beam incident on at least a top layer of the printing material of the physical object.

The parallel X-ray beam, upon impinging on the printing physical object at a predetermined angle, produces diffraction radiation directed away from the top layer of the physical object. The diffraction radiation is indicative of properties of the crystalline lattice of the printing material.

The study may be focused on measuring the structure of each layer and the interface between the adjacent layers as they are being laid down. However, the diffraction radiation may be also produced from planes of the 3-D printing physical object beneath a layer surface when the parallel X-ray beam penetrates in depth of the physical objects below the surface of the object being printed. The depth of the X-ray beam penetration depends on the material being printed and the physical property of interest.

The X-ray diffraction from each plane (top as well as lower ones) produces diffraction patterns (rings). Diffraction intensity peaks carry the useful information on the microstructure properties of the object under study, which are measured and analyzed for comprehensive quantification of the crystalline properties of the 3-D printing object.

The subject system further includes a scanning sub-system operatively coupled between the parallel incident X-ray beam and the physical object. The scanning sub-system is configured to controllably change relative disposition between the incident X-ray beam at the 3-D printing object during the 3-D printing process, either by scanning the X-ray beam relative to the printing object, or by displacing the printing object relative to the X-ray beam.

A reflector sub-system is positioned at a predetermined position relative to the X-ray beam and the printing physical object. The reflector sub-system is configured with an array of reflector crystals of a predetermined contour mounted on a substrate of a predetermined shape, such as, for example, a cylindrically contoured precise substrate, toroidally-shaped precise substrate, or other curved configurations suitable for the purposes and objectives of the subject system. The array of crystals is capable of capturing substantially the full-range corresponding to one or more diffraction ring(s), and reflecting of the diffracted intensity peaks. The curved substrate is positioned at a predetermined location relative to the X-ray beam and physical object in operational interaction with the diffraction radiation emanating therefrom to provide capturing of the comprehensive information by the array of crystal reflectors to be reflected to the corresponding detectors.

A data acquisition sub-system is operatively coupled to the reflector sub-system. The data acquisition sub-system includes a plurality of point detectors to detect the diffraction intensity peaks reflected from the crystals.

The point detectors are positioned in operative interaction with the array of crystal reflectors mounted on the curved substrate for capturing the diffraction radiation reflected from the crystal reflectors. The detectors produce output signals which express quantified intensity peaks of the reflected diffraction radiation.

A computer sub-system is operatively coupled to the scanning sub-system, the detectors, and the data acquisition sub-system. The computer sub-system is configured to control the operation of the entire subject system and to compute crystalline phase composition parameters and other microstructure properties of the printing material(s) in real-time during the 3-D printing process.

The data acquisition sub-system may include a software package for rectifying and processing the output signals. The software package may be exclusive for the data acquisition system, or may be shared with the computer sub-system.

The data acquisition sub-system and/or computer sub-system operate(s) to process the output signals produced by the point detectors. The processed output signals serve to detect, in real-time, the crystal phase composition results of the printing material, as well as a deviation of the material's microstructure properties from a predetermined (desired, expected) crystal phase composition parameter of the printing material, and to send a feedback signal to the 3-D printer's computer to adjust the process control parameters (such as, for example, temperature and/or pressure used in the process, printing material feed rate, the 3-D printing object position, a rate of the object position change, etc.)

For example, for monitoring two phase composition of the printing material, two sets of the reflecting crystals on a cylinder-shaped substrate are exposed to the diffraction radiation emanating from the object. The two sets of the crystal reflectors reflect two diffraction intensity peaks to two detectors (detector A and detector B) which are disposed in a predetermined position with respect to the crystal reflectors to capture the radiation reflected therefrom, respectively.

The output signals of the detector A and detector B, respectively, correspond to the intensity of the diffracted peaks. The computer sub-system computes a ratio of the signal A and B (which characterizes the phase composition of the printing material) as well as a deviation of the ratio from an expected ratio (reference or background data).

Additionally, a presence of a difference of the output signals produced by the detectors A and/or B from a known reference (background) signal may be indicative of a defective property, and is fed back to the 3-D printer to adjust its control parameters.

The computer sub-system is further configured to control the scanning sub-system to produce a desirable trajectory of motion of the incident parallel X-ray beam relative to the printing physical object. By changing the incident angle of the X-ray beam, a plurality of diffraction rings may be produced which are indicative of the crystalline lattice of the printing material, which can be measured by the subject system, for a more comprehensive analysis of the printing object.

The collimating optics includes apertures of various sizes which may be dynamically changed (under control of the computer sub-system or manually) to vary the size of the parallel X-ray beam impinging on the printing object.

In the subject system, the scanning sub-system includes a computer-controlled mechanism for changing a relative disposition between the impinging parallel X-ray beam and the printing object (either by scanning the X-ray beam relative to the printing object, or by moving the printing object relative to the stably held X-ray beam, or both).

The scanning sub-system also includes a computer controlled mechanism for synchronizing the motion of the X-ray beam (and/or the printing object) and the motion of reflector/detector sub-system. Such a mechanism preferably includes a platform supporting the X-ray beam, as well as supporting structures for the detector(s) and the reflector's substrate. A system of motors is operatively coupled to the object supporting platform, the X-ray source, and reflector's substrate. The motors are actuated by the computer sub-system to coordinate relative disposition of the all involved elements (X-ray beam, reflector, detector(s), the object supporting platform) in synchronism one with another, and in accord with the digital 3-D model of the printing physical object.

The curved substrate preferably may be configured as a cylinder-contoured structure. The array of flat crystal stripes are mounted on the inner surface of the cylinder-contoured substrate. The crystal stripes may be disposed parallel each to the other with a predetermined distance between the sides of the adjacent crystals.

The cylinder-contoured substrate may be formed of a thin polymer or metal (for example, aluminum alloy). The reflecting crystals may be LiF, Si, Ge, etc. crystals.

The radius R of the cylinder-contoured reflector sub-system is determined by the diffraction angle (θ) of the diffraction peak (specific for the material under study) and the spacing L between the printing area and the crystal reflectors.

A distance of the reflector sub-system from the printing object is determined by the diffraction peak and the radius R of the cylinder-contoured substrate as:

$$\tan(2\theta)=R/L. \quad \text{(Eq. 1)}$$

Alternatively, the substrate may be contoured as a toroid. The crystals for this implementation may have a somewhat arcuate configuration congruent with the shape of the toroidal surface. This implementation requires corresponding calibration computations to take into consideration the curvature of the reflecting crystals.

Another aspect of the subject invention addresses a method of real-time in-situ monitoring of microstructural properties of an added material during the 3-D printing process for a physical object manufactured from a three-dimensional digital model by depositing a number of layers of a material in succession.

The subject method would include the steps of:
forming an X-ray diffraction (XRD)-based quality monitoring system which has a low-power source of X-ray radiation and a collimating optic operatively coupled to the X-ray radiation generated by the X-ray radiation source;
adjusting the size of the parallel X-ray beam; and
directing the parallel X-ray beam onto a printing physical object at a predetermined incidence angle.

Upon impinging on the physical object, the parallel X-ray beam produces diffraction radiation which is directed away from the physical object. The diffraction (scattered) radiation may emanate from the top layer of the printing object. Depending on the angle of impinging of the parallel X-ray beam, the diffraction radiation may also be generated by layers (or crystallographic planes) of the 3-D printing physical object disposed beneath the surface of each layer in the printing 3-D physical object. The ability of deep penetration of the parallel X-ray beam into each layer of the 3-D printing physical object provides for a comprehensive analysis of the microstructural properties of the 3-D printing physical object not limited to the surface or exterior of each layer of an object being printed, but including the properties of lower planes such as points of fusion (interface) between layers and perimeters as well.

When the impinging X-ray beam is scattered (diffracted) from a crystal lattice of the printing material, peaks of scattered intensity are observed which correspond, in accordance with the Bragg's Law, to the following conditions:
The angle of the X-ray incidence is equal to the angle of scattering;

The pathlength difference is equal to an integer number "n" of wavelength.

The condition for maximum intensity contained in Bragg's Law allows calculation of details about the crystal structure in accordance with $$n \cdot \lambda = 2d \cdot \sin \theta, \quad \text{(Eq. 2)}$$

where n is an integer number,
λ is the wavelength of the X-ray incident upon the crystal lattice,
d is the crystal lattice spacing, and
θ is the diffraction angle which corresponds to the diffraction maximum (intensity peak).

Depending on the direction of the parallel X-ray beam, the scattered radiation produces a number of diffraction rings characteristic of the crystal lattice properties which are, in real-time, measured and analyzed for comprehensive quantification of the crystalline properties of the 3-D printing object.

One unique feature of the present method is that the measurements are not limited to a narrow angular area of the diffraction patterns (rings), as is the case in prior art systems, but may cover substantially the full range (360°) of the diffraction pattern(s), thus providing an increased amount of useful information on the micro-structure properties and positively contributing in the comprehensiveness of the microstructure properties analysis, resulting in a highly efficient, precise and robust quality control.

The subject method further continues by positioning a curved crystal reflector sub-system at a predetermined position relative to the physical object under study. The curved crystal reflector is configured with an array of reflector crystals of a predetermined shape mounted on the curved substrate of a predetermined shape, such as, for example, a cylindrically-contoured precise substrate, toroidally-shaped precise substrate, or other curved configurations suitable for purposes and objectives of the subject method for capturing and reflecting the full range of diffracted radiation by the array of crystals mounted on the substrate.

The curved crystal reflector is positioned at a predetermined location relative to the physical object in operational interaction with the diffraction radiation scattered therefrom. The scattered radiation impinges on the reflector crystals positioned specifically to capture the intensity peaks of the diffraction radiation, reflects therefrom, and are captured by the detectors, which may include a number of point detectors.

The detectors produce output signals (counts) corresponding to the intensity of peaks of the diffraction radiation reflected by corresponding sets of the reflecting crystals.

The method further includes the step of operatively coupling a data acquisition system to the plurality of point detectors to obtain the output signals produced thereat. The data acquisition system in the present method may operate as an independent entity or in cooperation with a computer sub-system.

The computer sub-system is operatively coupled to the detectors and the data acquisition sub-system. The subject method addresses the step of configuration of the computer sub-system to compute crystalline phase composition parameters and other microstructure properties of the printing materials in real-time during the 3-D printing process.

The method further includes the steps of detecting a deviation of the microstructure properties, for example, the crystal phase composition parameters of the printing material, from a predetermined (expected) crystal phase composition parameter of the printing material (signature of quality) by quantifying the difference in the intensity peak signals between the reference (or background) intensity peak and the intensity peak detected by the detectors.

The method further comprises the steps of configuring the data acquisition sub-system and/or computer sub-system to detect a deviation of the crystal properties of the printing layer (as well as/or lower layers) from a reference (background) microstructure property specific to an expected data characteristic of a quality object.

For example, the method may include the steps of monitoring two-phase composition of the printing material where two (or more) sets of the reflecting crystals of the cylinder-shaped substrate reflect two (or more) diffraction peaks to two (or more) corresponding detectors (detector A and detector B, etc.). The readings of the two detectors A and B may be used to compute their ratio, which are indicative of the phase composition of the printing material. The difference in intensity detected by the detectors from the reference (background) signal may be also indicative of a defective material property. A signal corresponding to the deviation is subsequently fed back to the 3-D printer to adjust the control parameters of the process.

One of the important steps of the subject method is to vary the size of the parallel X-ray beam by applying various apertures (either under the control of the computer sub-system or manually) to the incident X-ray beam.

The subject method is enhanced with providing a scanning sub-system, and configuring the computer sub-system to control the scanning sub-system to produce a desirable trajectory of motion and angle of incidence of the incident parallel X-ray beam relative to the printing physical object.

These and other objects and advantages of the present invention will be apparent after reading further description of the preferred embodiment(s) of the subject invention in conjunction with accompanying Drawings in the subject patent application.

DETAILED DESCRIPTION OF THE PREFERRED EMBODIMENT(S)

Figure 1:
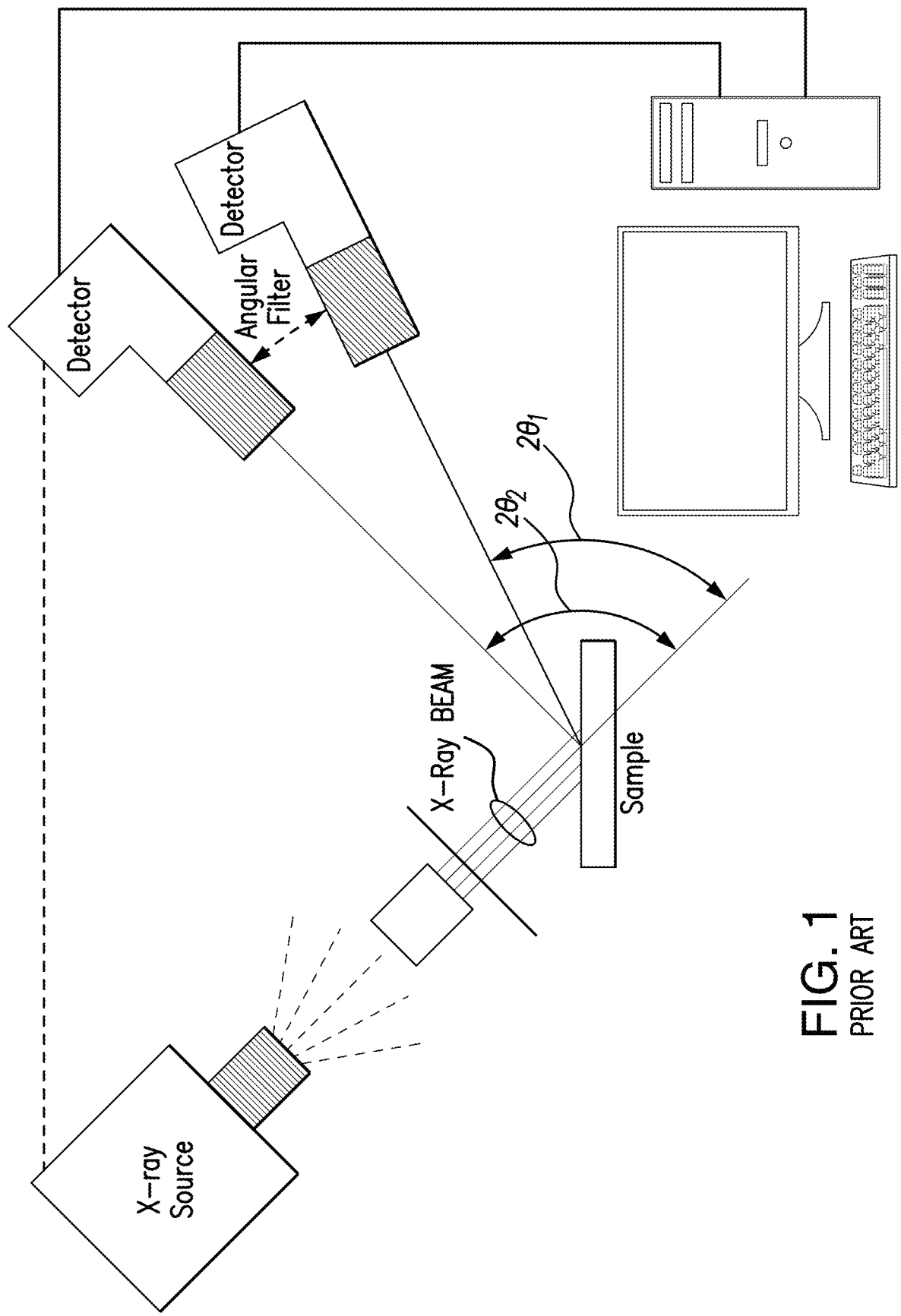
FIG. 1 is a schematic depiction of a prior art in-situ X-ray diffraction system using sources and detectors at fixed angular positions.

The subject in-situ system (also referred to herein as a phase composition analyzer) for monitoring microstructure properties of a 3-D printing object, has great potential in the real-time quality assurance, and effective quality control for high performance 3D-Printing applications. The subject technology is a major QC (quality control) tool for 3-D printing objects used in the health care, aviation, automotive, and defense, etc., industries.

The performance of functional materials (parts) is dependent on their microstructure. The growth and formation of these materials are also closely related to their chemical composition and microstructure properties. In many applications, X-ray diffraction (XRD) approach is a suitable choice for investigation of the performance and failure of the critical components. The subject in-situ XRD analyzer is useful in conjunction with 3-D printing systems to directly measure the microstructure properties during 3-D printing process in real-time, thus providing the important information for quality assurance.

Crystalline phase composition is one of critical microstructure properties determining the quality of metal 3D printing parts. The prevalent deviations of the phase composition from desirable value may bring an adverse impact to the performance and quality of the printing parts (also referred to herein as objects). Although sometimes these deviations can be corrected by post production treatments, in many cases, however, it is impossible for the produced parts to meet the quality specifications after the printing process has been completed.

The subject system is designed for in-situ real time measurements of various microstructure properties, such as, for example, phase composition (which is the ratio of two or more phases which are crystalline materials), texture, crystal lattice structure, crystallinity (which is a ratio of crystalline material vs. the amorphous material), water penetration, etc., of 3-D printing objects and is applicable to objects manufactured from materials (metals, semiconductors, polymers, nanomaterial, etc.).

The real-time result of the microstructure properties measurements and analysis is achieved by taking advantage of an intensive parallel X-ray collimated beam, and XRD data acquisition using an innovative efficient configuration.

The subject XRD analyzer uses a size-adjustable (from 0.5 mm to 10 mm) and scannable (along a precise scanning path) incident parallel X-ray beam, multiple point detectors (or an imaging detector), and an array of reflecting crystals disposed relative to the printing object in a specific fashion aiming to select multiple diffraction peaks to improve the counting rate, increase preciseness, increase reliability of measurements, and reduce the scattering noise.

The subject in-situ XRD analyzer uses X-ray energy significantly lower than the X-rays for industrial radiography or CT, and thus, the radiation safety warranty of the analyzer in question can be easily achieved by shielding with conventional stainless steel plate or quarter inch lead glass.

The parallel X-ray incident beam with an adjusted beam size comes from a compact, low-power X-ray source combined with an advanced collimating X-ray optic. The parallel beam geometry enables flexible system configuration and improved measurement reliability. The real-time diffraction data can provide physical information of the crystal phase composition, which is closely related to the defects and performance of the printing parts.

The subject in-situ system provides an efficient way to monitor the quality of 3D printing objects during the printing process with a significant potential for effective process control based on the reliable microstructure properties feedback. For example, for 3-D printing of steel objects, diffraction peak positions in diffraction patterns emanating from objects under study correlate to the presence of a specific phase 27, for example, an FCC phase (ferrite) and a BCC phase (ferrite or martensite). The microstructure phase (FCC vs. BCC) composition is correlated to the quality of the object under study. The diffraction peaks counts are directly related to the phase composition.

Figure 2:
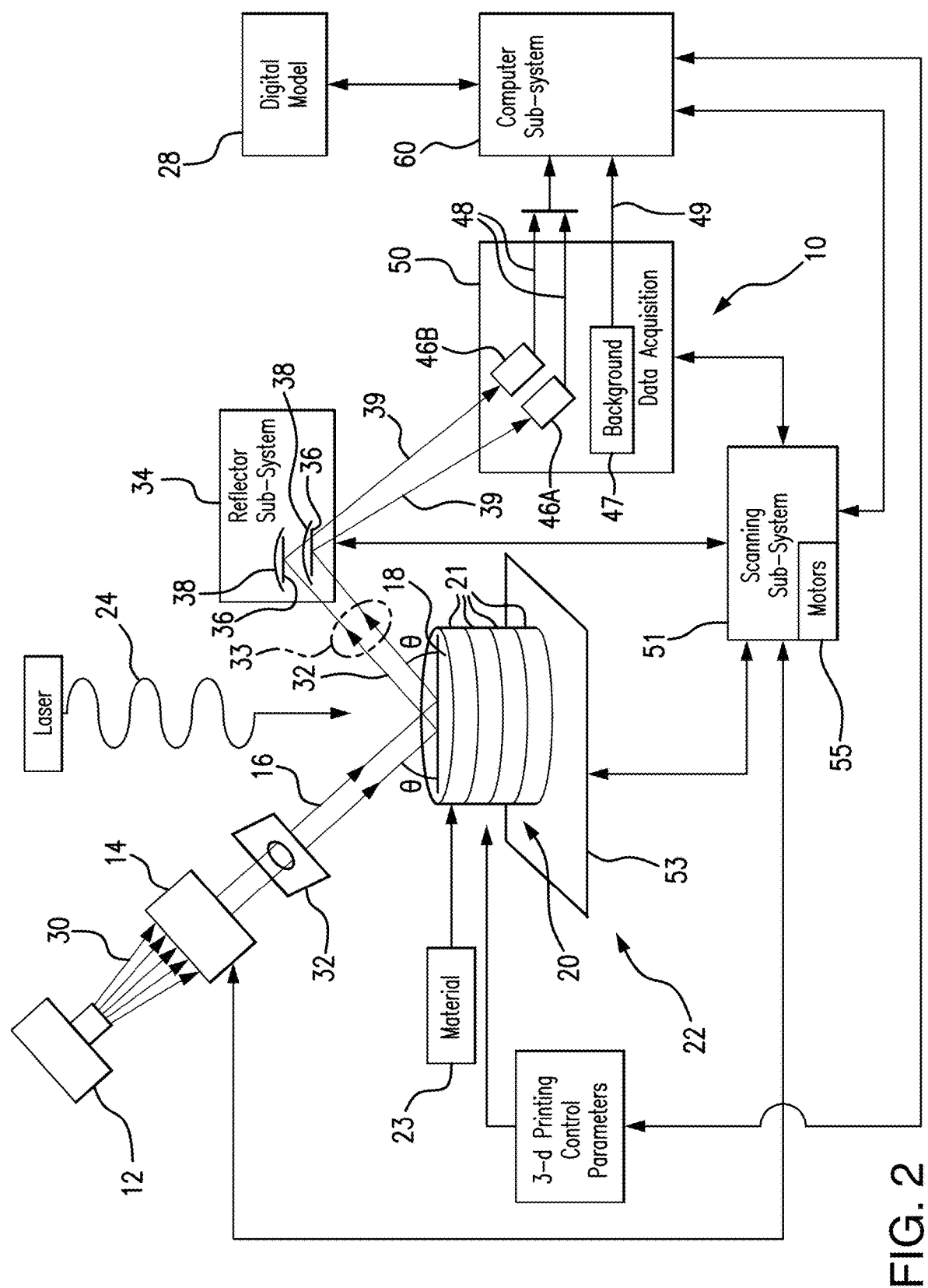
FIG. 2 is a schematic representation of the subject in-situ real-time XRD-based quality monitoring analyzer system operating with a 3-D printer system.

As shown in FIG. 2, the subject system 10 includes an X-ray source 12 equipped with, or operating in conjunction with, a collimating optic 14 (detailed in further paragraphs) for shaping and sizing an X-ray beam 16 which is incident, in a predetermined controlled fashion, onto a surface of a working and measuring layer 18 of a sample (printing object) 20 under study.

A compact low power X-ray source 12 may be used, such as, for example, MOXTEK™ Magpro 12W source, or Newton10W miniature X-ray source. The power of the source operation may range from 10 W to 20 W. The X-ray source 12 generates divergent X-rays 30 which may be emitted from an X-ray tube, resulting from electron bombardment of an anode.

In 3-D printing manufacturing, the object 20 is printed in a layer-by-layer fashion, where successive layers 21 are deposited one on another. In a 3-D printer 22, a material 23 (such as liquid molecules or powder grains) is added from a 3-D printer extruder, and subsequently is solidified (fused) by various methodologies, for example, laser sintering. A laser beam 24 is scanned over the surface 18 of the added material under computer control, to create the 3-dimensional object, in accordance with a digital 3-D printing model 28, such as, for example, a Computer-Aided Design (CAD) model or AMF (Additive Manufacturing File), usually by successively adding material layer-by-layer to create the 3-D object 20. The printing objects can be of almost any shape or geometry.

A large number of additive processes are available. The main difference between processes is in the way layers are deposited to create parts and in the materials that are used. Some methods transition the physical phase of a material to produce the layer. In fused material deposition, parts are produced by extruding the material which hardens immediately to form layers. A filament of thermoplastic metal wire, or other material is fed into an extrusion nozzle head (3-D printer extruder) which heats the material and turns the flow ON and OFF. Another technique fuses parts of the layer and then moves it upward in the working area, adding another layer of granules and repeating the process until the piece has been built up.

Laser sintering techniques include selective laser sintering with both metal and polymers, and direct metal laser sintering.

Electron Beam Melting (EBM) is another type of additive manufacturing technology for metal parts (e.g., titanium alloys). EBM manufactures parts by melting metal powder layer-by-layer with an electron beam in a high vacuum.

Another method uses an inkjet 3-D printing system, which creates the model one layer at a time by spreading a layer of powder and printing a binder in the cross-section of the part using an inkjet-like process. Also, stereolithography (SLA) is an additive manufacturing process that changes resin chemistry layer by layer using photopolymerization.

Whatever method for 3-D printing is used to create 3-D objects, a printer laser beam, electron beam, or other source of radiation 24 (capable of forming layers of a material of a predetermined energy) is incident on the sample 20 and is scanned over the working layer 18 in a predetermined scanning trajectory in accordance with the commands of the Computer-Aided Design package (or Additive Manufacturing File) 28 applied to a material 23 delivered by the 3-D printer extruder.

The subject system 10 shown in FIG. 2 is applicable to any of the 3-D additive technologies to in-situ real-time monitor the quality of the 3-D printing object 20.

The subject system 10 is applicable to measurements on numerous materials used in 3-D printing (additive manufacturing), which include, but are not limited to, metals, stainless steel, titanium-based alloy, aluminum-based alloy, nickel-based alloy which includes nickel super alloy, and cobalt-based alloy, as well as polymers, semiconductors, nano-materials, etc.

The subject system 10 uses the size adjustable (from 0.5 mm to 6 mm, or more than 10 mm) incident parallel X-ray beam 16, multiple point detectors 46, and an array of single crystals 36 as reflectors mounted on the precise substrate 38 of an arcuate (curved) shape to select the diffraction peaks, to improve the counting rate, and reduce the scattering noise.

The composition of the phase can be determined by the counts corresponding to the major peaks. The real-time ratio of the counts data from the two or more point detector 46 is directly related with the phase composition of the printing layer 18. An additional X-ray detector may be used to measure the background counts. Typically, the background detector is set at an angular position non-overlapped with any phase peaks. Alternatively, a reference count data may be used instead of the background detector for determining presence of the deviation of counts from a reference count signal.

The collimating optic 14 is positioned on the path of the diverging X-rays 30. The collimating optic 14 is a system configured to produce a sufficiently parallel X-ray beam 16 to generate a diffraction pattern useable in measurements. Among other collimating optic systems, the subject system 10 may use collimating polycapillary optics. The polycapillary optic includes a number of thin, hollow tubes that collect a portion of the diverging X-rays 30 over a significant angle, transmits and redirects the photons from their straight paths via total reflection inside the channels, and collimates the collected divergent X-rays 30 into the parallel X-ray beam 16 directed at the working measuring layer 18 of the sample 20.

The inclusion of the collimating optic 14 produces the parallel beam 16 of sufficient intensity to accomplish the desired measurements in a time frame that enables immediate feedback while utilizing the low power source 12. The parallel beam 16 utilized in the subject system 10 eliminates the need for significant sample preparation. The use of high-efficiency polycapillary for collimating optic 14 allows both for higher intensity beams (shorter measurement times) and smaller, lower cost, low power X-ray sources.

The subject system may use the scanning during operation, or the scanning may be omitted. Scanning may be performed once, to determine the shape of the scan curves and ultimate angular position of the detectors.

The system 10 further may include a shutter (not shown in the Drawings) in order to block the parallel beam 16 entirely when required by the process.

In order to adjust the size (cross-section) of the X-ray parallel beam 16, the system 10 may use a system of apertures 31 of different sizes which may be replaced under control of a computer system, or manually. The subject system 10 contemplates adjustment of the size of the X-ray beam 16 in the range from 0.5 mm to 6 mm, or even larger than 10 mm, depending on the resolution requirements, size of features under study, control parameters of the printing process, as well as material and scanning parameters of the process.

The parallel beam 16 of X-rays impinges upon the working and measuring layer 18 of the 3-D printing object 20 and is diffracted by the crystalline phases in the object 20 according to Bragg's Law $$n\lambda = 2d \sin \theta \quad \text{(Eq. 3)}$$

where d is the spacing between atomic planes in the crystalline phase, n is an integer number, $\theta$ is the angle of incidence of the parallel X-ray 16 beam onto the object 20, and $\lambda$ is the wavelength of the incident X-ray.

The impinging X-ray beam 16 diffracts (scatters) by the crystalline phase of the object 20 and generates the diffracted beams 32, which emanate from the object 20 and create diffraction patterns (or diffraction rings) 33. The intensity of the X-rays within the diffracted beam 32 is measured as a function of the angle 20.

The diffraction pattern 33 may be used in the present system 10 to identify and monitor the crystalline phases and other microstructural properties of the working and measuring layer 18 of the object 20. The subject system is not limited to collecting signals indicative of the properties of only the top surfaces 18, but also is capable of penetrating in-depth of the object 20 to generate diffraction patterns indicative of the microstructural properties of the planes underlying surface of each layer 18 of the 3-D printing object 20. This is provided by changing the incident angle of the X-ray beam 16 relative to the object 20.

Although being capable of examining deep layers, the subject system does not purport to examine deep layers after they have been deposited. Instead, the analysis is focused on measurements below the surface of each layer 21 during its fabrication, i.e., as the layer is being deposited. In other words, the subject system does not necessarily look below the top layer, but preferably it looks into each layer while it is printing.

The bottom surface of each layer may be examined for useful information, as this is the region where the layer being deposited fuses to the previous layer that was deposited. The depth of penetration into the printing object depends on the layer thickness, opacity of the material and the energy of the beam 16.

The diffraction beam 32, emanates from the working and measuring layer 18 of the object 20 (or from lower crystalline planes) and passes therefrom towards a reflector sub-system 34. The reflector sub-system 34 in the subject system 10 is uniquely configured and located to be able to capture all possible useful diffraction signals from the 3-D printing object 20. Specifically, the reflector sub-system 34 is designed to capture diffraction intensities peaks across substantially 360° of the diffraction ring(s) 33 emanating from the object 20.

Figure 3:
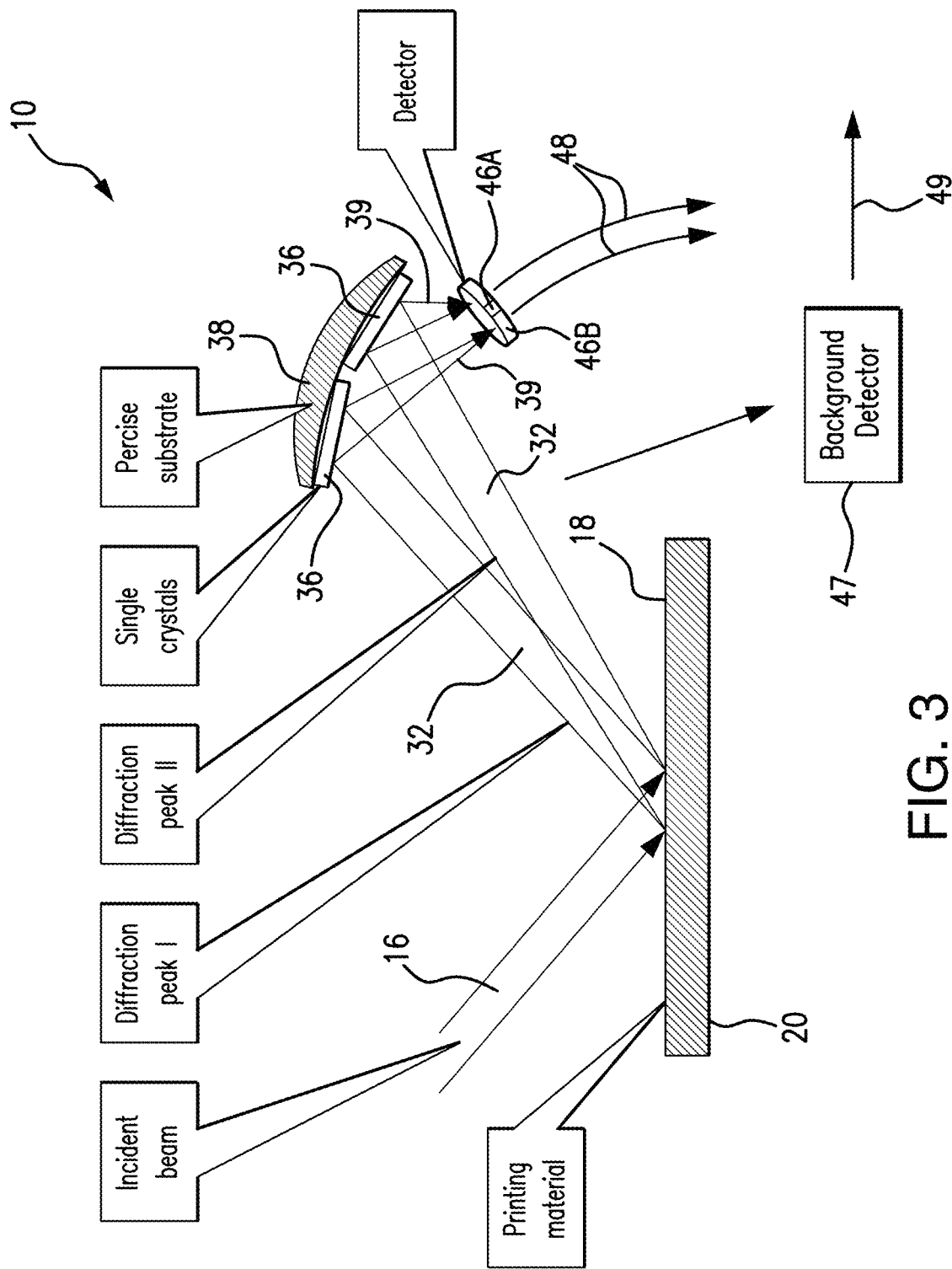
FIG. 3 is a diagram representative of the principles for performing the XRD measurements of the microstructure properties of 3D-printing objects in the subject system using a curved substrate with flat reflecting crystals mounted thereon.
Figure 4A:
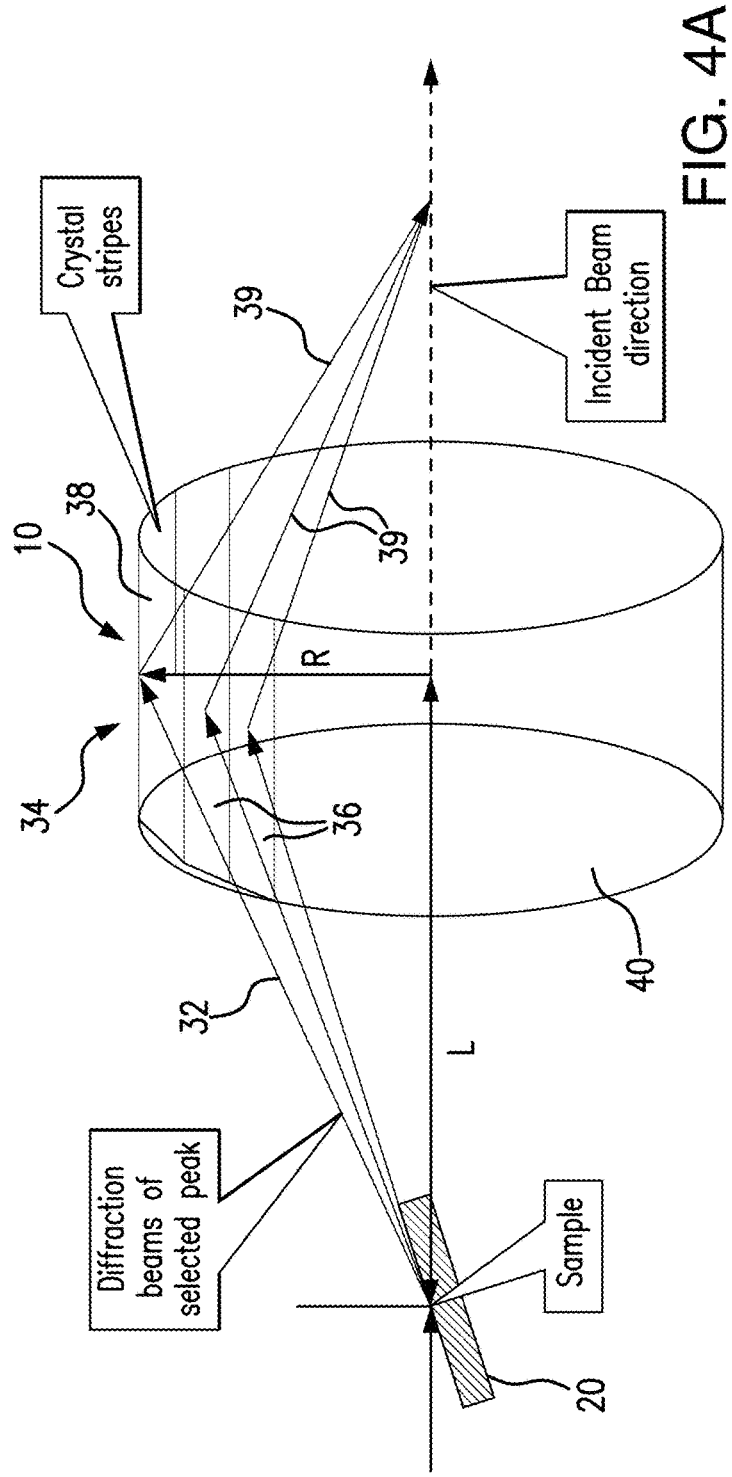
FIG. 4A is representative of the subject system equipped with a cylinder-shaped reflector.
Figure 4B:
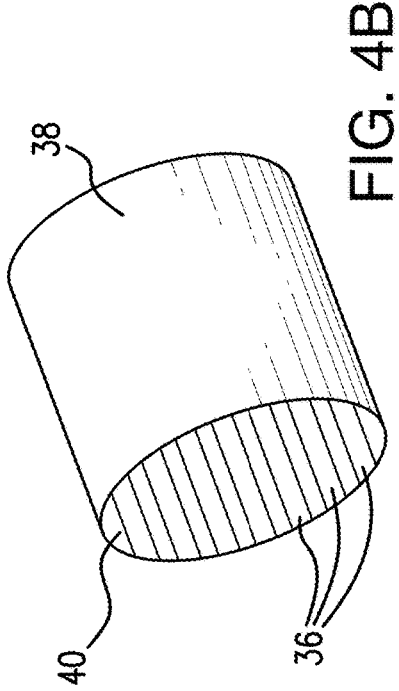
FIG. 4B shows the specifics of the cylinder-shaped reflector.

As shown in FIGS. 2, 3, 4A-4B, and 5, the reflector sub-system 34 uses an array (or a cluster) of small crystals 36 disposed in a predetermined fashion on a curved substrate 38. For example, as shown in FIG. 4, the curved substrate 38 may be shaped as a cylinder. A cluster of small flat crystal stripes 36 may be mounted on the inner surface 40 of the cylinder-contoured substrate 38, with a predetermined spacing therebetween, as best shown in FIG. 4B.

The cylinder-shaped substrate 38, as well as other curved substrates, may be made of either a polymer or a metal, such as, for example, aluminum alloy. The crystal stripes 36 could be single crystals, such as, for example, LiF, Si, Ge, etc.

Figure 5:
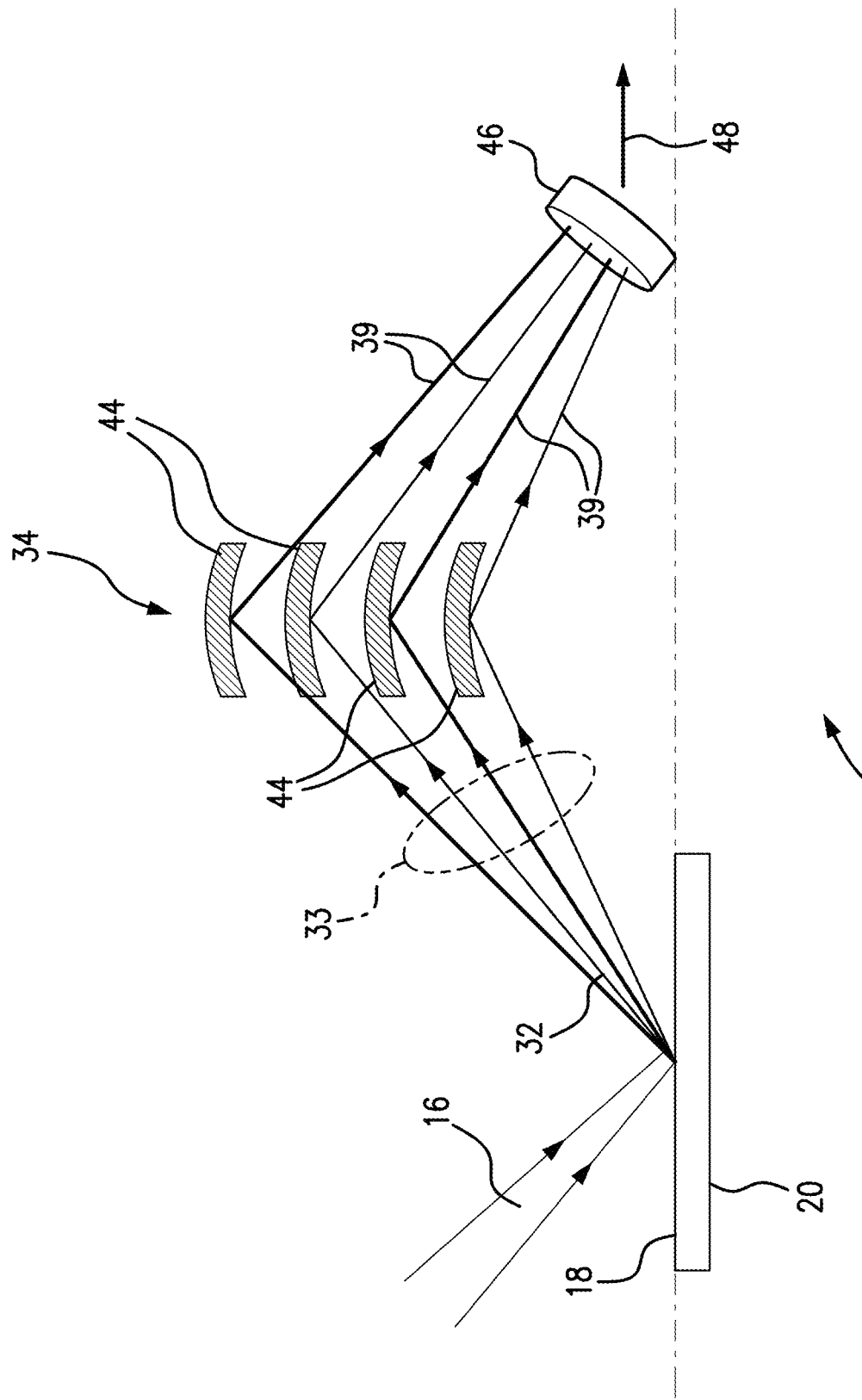
FIG. 5 is a schematic diagram of the reflector having toroid shape used in the subject system.

In an alternative embodiment of the reflector sub-system 34, shown for example in FIG. 5, the toroid shaped reflector sub-system 34 may be used. The toroid shaped substrate 42 may have small crystals 44 having somewhat an arcuated configuration. In this implementation, the measurement results are to be adjusted to take into consideration the curvature of the crystals 44.

The cylindrical, as well as the toroid configuration of the substrate 38, matches the diffraction rings 33, and thus enables the reflector sub-system 34 to capture a large portion of the diffraction signals covering substantially a full angular range (360°) or close thereto.

Either in the cylindrically-shaped reflector sub-system 34 (shown in FIGS. 4A-4B), or in the toroidally shaped reflector sub-system as shown in FIG. 5, the radius R of the cylindrical (or toroidal) body, is determined by the diffraction angle $\theta$ determined by the selected material phase.

The position L of the cylinder (distance from the object 20) is determined by the diffraction angle $\theta$ (corresponding also to the incidence angle $\theta$ of the X-ray beam 16 for the intensity peaks capturing) and the radius R of the cylinder in accordance with $$\tan(2\theta) = R/L \quad \text{(Eq. 4)}$$

Thus, the distance L of the reflector sub-system 34 from the object 20 is determined by a material under study (which determines the $\theta$ angle of its diffraction peak).

By making the incident angle of the selected diffraction peak equal to the Bragg angle of the crystals 36 on the cylinder's inner surface 40, the reflector sub-system 34 selects the diffraction peaks. The use of the collimating parallel beam from the X-ray source is one of the most straightforward ways to provide collection of the diffraction peak(s) with a cluster of the crystal stripes 36 without losing the peak signal.

The crystal based reflector sub-system 34 in the subject system 10 is capable of capturing numerous useful signals covering substantially the entire 360° range of the diffraction ring(s) 33, thus significantly increasing the efficiency and the reliability of the measurements. In addition, the crystals 36 used as reflectors positioned in precise locations relative to the object 20 are exposed only to the useful diffraction radiation. This arrangement permits a significant reduction in the adverse influence from "noisy" scattering X-rays and fluorescent X-rays which may constitute a problem for metal XRD measurements.

Based on the diffraction principle, only the X-rays with certain energy and direction can be directed to the single crystals 36 in the reflector sub-system 34. Most of the scattering X-rays and fluorescent X-rays from the printed material will be filtered out by the single crystals 36. The reflector crystals 36 thus can significantly reduce the adverse influence from the scattering X-rays and fluorescent X-rays, which could be problematic for metal XRD measurements.

The profile of the substrate 38 is based on the angular position of selected diffraction peaks from a specific phase of the printing material. As shown in an exemplary implementation illustrated in FIG. 3, the arcuated substrate 38 carries thereon at least two single flat crystals 36 disposed at precise positions to be impinged by and to reflect two selected diffraction peaks (peak I and peak II) from one specific phase of the material on the working and measuring layer 18. Both diffraction peak signals (I and II) are reflected from respective crystals 36, and subsequently pass to a point detector 46, or two point detectors 46, each of which is located to capture a corresponding diffraction peak signal (I or II), respectively.

This approach to select multiple diffraction peaks from any one specific phase of the layer 18 can maximize the measurement efficiency of the subject system. The profile design of the substrate 38 can be based on the phase of the materials and other system configuration parameters.

The phase composition may be a critical indicator of the quality of the printed objects. Real time results related to the quality of the objects during the 3-D printing process is readily output by the data acquisition system 50.

The data processing to assess phase composition is straightforward. The ratio of the counts from multiple reflector crystals 36 is directly related to the phase composition of the printed materials, and they may be used in computations for determining the phase composition of the printing material under study.

In operation, for monitoring two-phase in the printing material, two sets of crystals 36 on the corresponding cylinder (or toroidal, or any curved) substrate 38 are used to select the two diffraction peaks to two point detectors 46. The ratio of the counts from the two detectors 46 will serve as the outcome of the data acquisition sub-system 50 indicative of the phase composition. The data acquisition sub-system 50 includes a number of detectors 46 producing output signals 48 which correspond to intensity peaks (signals 39) reflected from the crystals 36. The data acquisition sub-system 50 also may include software to process output signals 48 for analysis of the real-time measurements. Alternatively, a computer 60 may process the output signal from the detectors 46 and analyze the properties of the printing material.

Figure 6D:
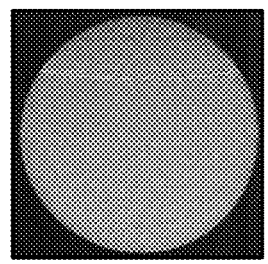
FIGS. 6C-6D show a good stainless steel AM sample (FIG. 6C) and corresponding XRD imaging data (FIG. 6D), respectively.
Figure 6C:
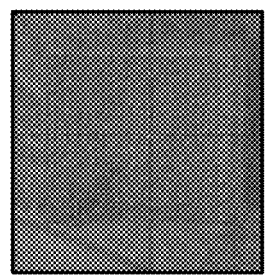
Figure 6B:
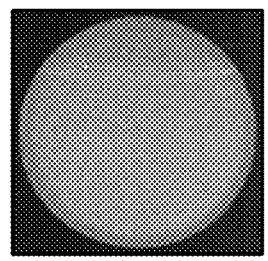
FIGS. 6A-6B show a defective stainless steel AM sample (FIG. 6A) with corresponding XRD imaging data (FIG. 6B), respectively.
Figure 6A:
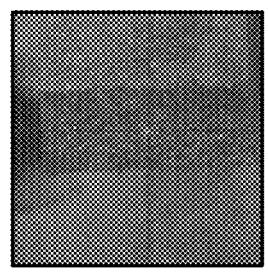

FIGS. 6B and 6D present diffraction patterns from stainless steel samples, shown in FIGS. 6A and 6C, respectively. In FIG. 6A, a defective stainless steel sample produces its XRD imaging data (FIG. 6B). A good stainless steel AM sample (FIG. 6C) has a corresponding XRD imaging data (FIG. 6D).

A Bruker C2 system was used for data collection. The AM samples were for a maraging 1.2709 stainless steel AM part (ProX 200 DMLS 3D).

Figure 7:
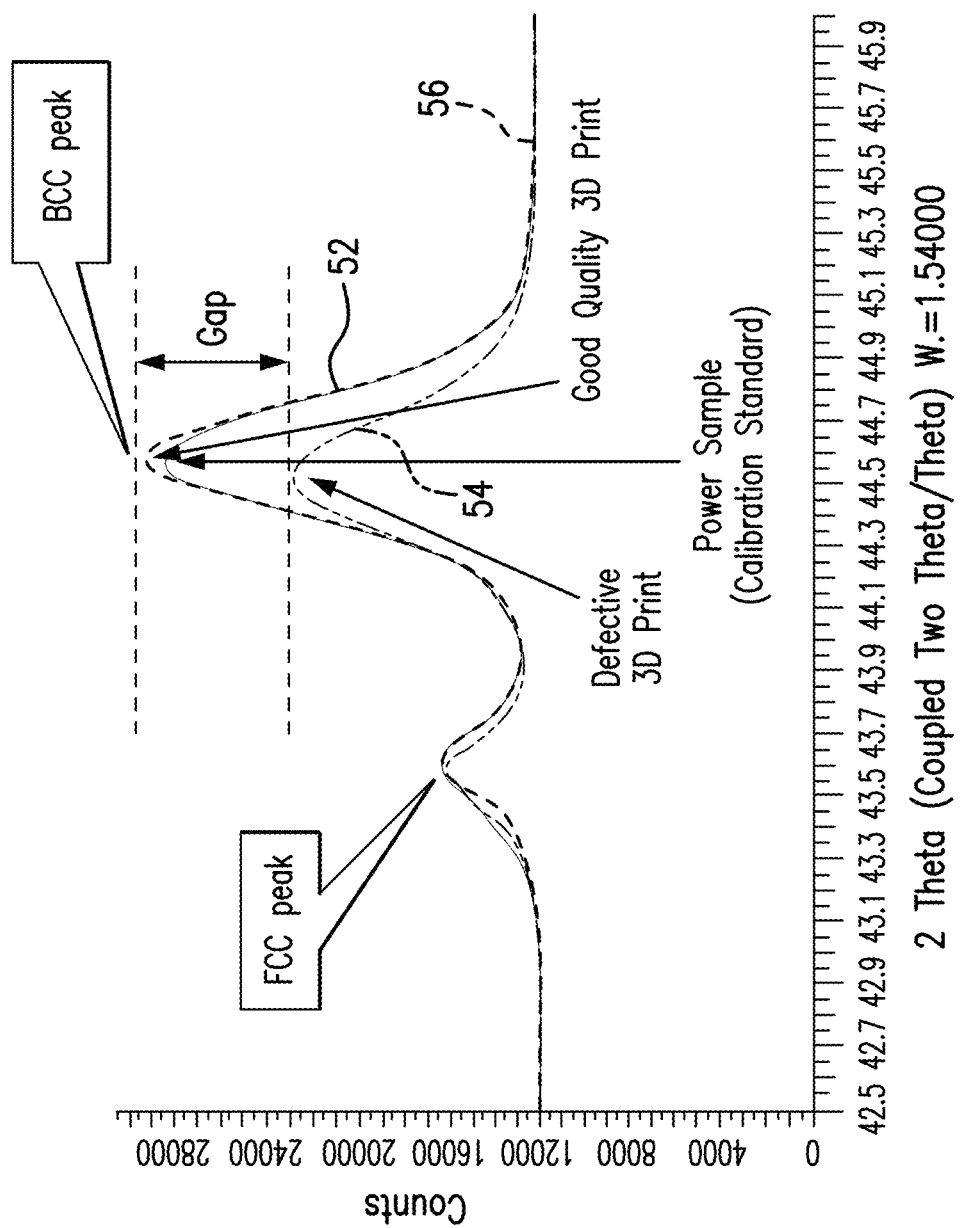
FIG. 7 is a diagram representative of XRD measurements on the crystal phase composition of samples under study performed by the subject system showing a significant deviation of the measured phase composition of the printing object from the phase composition of the powder in a defective sample.

XRD measurements and analysis have been performed on the data that has shown solid correlation between the crystal phase composition and the 3-D printing object quality. As shown in FIG. 7, the intensity peaks positions correlate to the presence of an FCC phase (ferrite) and a BCC phase (ferrite or martensite).

The relative phase composition (BCC/FCC) is correlated to the sample quality. In FIG. 7, the diagram 52 corresponds to an acceptable sample, while the diagram 54 corresponds to the defective sample. The diagram 56 corresponds to a powder sample. As shown, the defective sample counts 54 have significant deviation from the counts corresponding to the phase composition of the powder sample 56.

In this test and analysis, the gap in BCC peak counts between the acceptable and defective samples is about 6000. By taking into account the base counts 12000, and the FCC counts 16500, the relative phase composition for the acceptable sample is 3.78, while the phase composition for the defective part is 2.44. The 2.44 vs. 3.78 represent potential industry bench marks to set the quality signature of the stainless steel AM objects.

The computational results can be used in the subject system to monitor the quality of printing objects in real-time by collecting diffraction peak counts by the point detectors from 2θ angle of 43.55° and 44.6° respectively. The ratio of the counts can be used to measure the quality of the printing objects.

In the case where the diffraction angle of a specific phase is known, the diffraction pattern reflection sub-system 34 can be placed in position corresponding thereto. As such, two detectors 46 may be included in the subject system to acquire data from two different diffraction angles, reflected by the two sets of the crystals 36, respectively.

A "background" detector 47 may be used to obtain background level information from a region in which there is expected to be no diffraction peak, while the detectors 46 measure the intensity of X-ray radiation directed to them by respective reflector crystals 36.

The computer sub-system 60 controls the operation of the entire subject system 10. In cooperation with the data acquisition sub-system 50, the computer sub-system 60 performs computations to determine phase composition.

The computer sub-system 50 obtains a ratio of the signals 48 submitted thereto from the detectors 46 and 47 to determine the amount of a given phase. In the case where none of a given phase is present, the counts in the region of interest for the diffracted beams 32 at the detector 46 is the same as the counts in the background measured at the detector 47, yielding a ratio of close to 1:1. As the amount of the given phase increase, this ratio becomes greater than one, and an accurate determination of the percentage of that phase present in the object 20 can be computed.

In addition, the subject computer sub-system 60 can detect deviation of the output signal 48 of the detector 46 from the readings of the detector 47 (or a reference data), thus determining presence of possible defects in the printing object.

In operation, the subject system 10 performs a dynamic in-situ quality monitoring where a size-adjustable parallel X-ray beam impinges onto the layer of the object 20 in real time during the manufacturing process. The source of X-ray could be scannable, i.e., capable of moving away or near the object 20, in order to keep the geometrical requirements of relative disposition between the X-ray beam and the reflector/detector sub-assembly.

If the X-ray source is to be moved, the reflector sub-system 34 (along with the detector 46) has to be moved in synchronization therewith. At each position, the reflector/detector sub-assembly is to be in position to meet the Bragg condition of the crystals 36.

The X-ray 16 can be scanned relative to the object 20 during the manufacturing process. Alternatively, the object 20 may be displaced relative to the X-ray beam 16. The dynamic adjustment of the cross-section of the incident parallel X-ray beam 16 permits control of the area (position and size) under test. During operation, if the position of the parallel X-ray beam 16 is changed relative to the object 20 in a predetermined motion, the reflectors 36 and detectors 46, 47 also move in synchronism with the X-ray source 12 and/or object 20, so that in each position, the reflector sub-system 34 is positioned to meet the Bragg condition of the crystals 36, and the detectors 46, 47 are to be displaced accordingly to be able to cooperate with the reflectors 36 in order to capture the radiation reflected from them.

In order to provide the synchronized motion of all the involved elements of the subject system 10, a scanning sub-system 51 is operatively coupled to the object supporting platform 53, to the source 12 of the X-ray, to the reflection sub-system 34, and to the detectors 46, 47. The computer sub-system 60 controls displacements of the elements 53, 12, 34, and 46, 47 in synchronism one with another. The scanning sub-system 51 uses a system of motors (for example, servo-motors) 55 which are actuated and operate under control of the computer sub-system 60 to displace supporting structures (not shown) of the platform 53, source 12, curved substrate 38, and detectors 46, 47, thus monitoring their displacement in synchronism each with another, as well as in accordance with the digital model 28 of the physical object 20.

The computer sub-system 60, in coordination with the acquisition sub-system 50, operates to detect abnormalities in the printing object during the manufacturing process in real-time, and feeds back the detected abnormality to the 3-D printer system 22 to adjust, in real-time, the 3-D printer process control parameters.

Figure 8:
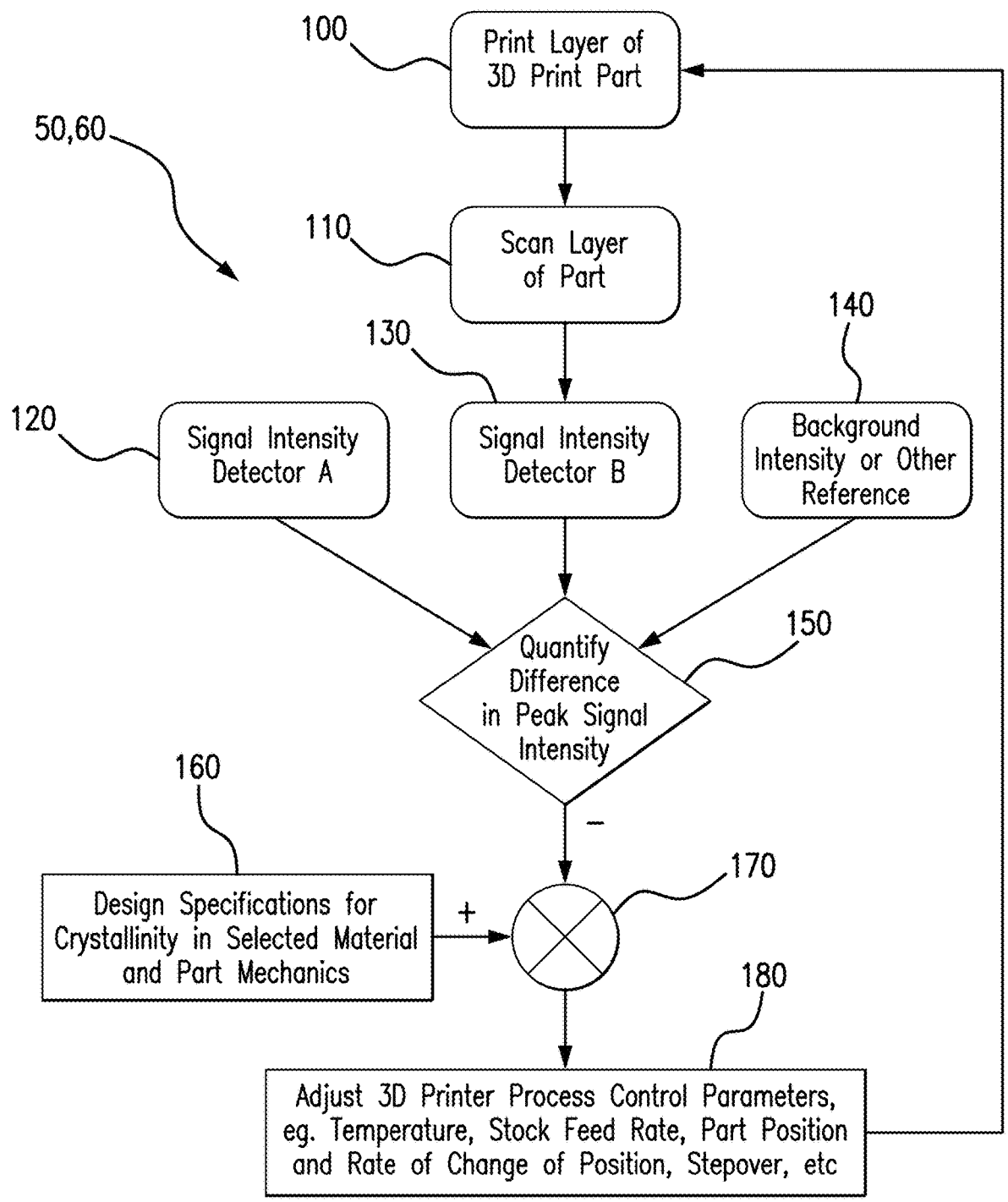
FIG. 8 is a flow-chart diagram of the operational steps of the method supported by the subject system.

As illustrated in FIG. 8 and in combination with FIG. 2, the subject process operates in the following fashion:

In step 100, a printing material 23 is deposited to form a layer 21 of the 3-D printed object 20. The procedure subsequently follows to the step 110 where the X-ray 16 is scanned over the layer 21 of the object 20 in a predetermined fashion as provided by the scanning sub-system 51 under control of the computer 60.

As presented in previous paragraphs, the impinging X-ray beam 16, when scanned over the layer 21 of the object 20, causes a diffraction on the crystal phase of the material of the of the layer 21 and is scattered over the crystal lattice of the material 23 under study. Peaks of scattered (diffracted) intensity which correspond to the angle of incidence of the X-ray beam 16 which equals the angle of scattering are observed, and to the passlength difference which is equal to an integer number of wavelengths of the X-ray beam 46. The condition for maximum intensity contained in Bragg's Law permits calculation of details about the crystal structure of the material of interest on the working surface top layer 18 of object 20, or layers beneath the top layer.

The diffracted beams 32 emanate from the object 20 under study and impinge on the crystal reflectors 36 of the reflector sub-system 34, as was discussed in previous paragraphs.

The reflector sub-system 34 is positioned with regard to the sample 20 under study in such a fashion that respective crystals 36 are exposed to the diffraction beams 32 emanating from the sample 20 under study. The diffraction signals 32 impinging onto the crystals 36 of the reflector sub-system 34 reflect therefrom, and reflected diffraction radiation 39 travels to the respective detectors 46.

In the subject measurement scheme, as shown in FIG. 3, for example, a detector 46A and a detector 46B are positioned so that they capture the diffraction peak I (at the detector A) and a diffraction peak II (at the detector B).

In step 120, the detector A produces an output signal corresponding to the signal intensity of the diffraction peak 1. In step 130, the detector B produces an output corresponding to the signal intensity of the diffraction peak II. In step 140, the system takes advantage of an additional background detector 47 to measure a background intensity 49 of the sample 20 under study. Alternatively, a reference (calibration or expected signal intensity) can be used for a known material.

In step 150, the system, and specifically the data acquisition system 50 and the computer sub-system 60, determines the difference in the intensity peak signal between the detector A (signal 48) and the background detector (or the reference intensity) signal 49, as well as between the signal intensity detected by the detector B and the background (or reference) intensity, as well as the difference between the readings of the detector A and detector B.

In step 170, the quantified differences determined in step 150 are correlated with design specifications for crystallinity in selected materials and part mechanics obtained from the digital model file 28 (Step 160).

Subsequently, the logic moves to step 180 where 3-D printing process control parameters (such as temperature, stock feed rate, part position and rate of change of position, Stepover, etc.) are adjusted if discrepancies are determined between the readings of the detectors A, B and background detector (of the reference data) and the design specifications.

In addition, the data acquisition system 50, in cooperation with the computer sub-system 60, can calculate the ratio between the readings 48 of the detector A and the background (reference) signal 49, as well as between readings 48 of the detector B and the background (reference) readings 49, as well as ratio of the readings of the detector A and detector B, to obtain the phase composition of the material under study.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. An X-ray diffraction (XRD) system for real-time in-situ measurements of microstructure properties of a printing material during 3-D printing process, comprising:

a source of an X-ray radiation, a collimating optic sub-system operatively coupled to the X-ray radiation generated by said source, said collimating optic sub-system being positioned in operative interaction with said X-ray radiation to produce a parallel X-ray beam incident on a physical object manufactured from a 3-dimensional digital model by depositing a number of layers of a printing material in succession, and wherein said parallel X-ray beam, upon impinging on said physical object, produces diffraction radiation directed away from said physical object;

an aperture sub-system operatively coupled to said parallel X-ray beam and operating to vary a size of said parallel X-ray beam a reflector sub-system positioned at a predetermined position relative to said physical object, said reflector sub-system having an arcuated substrate of a predetermined shape, and an array of reflector crystals of a predetermined configuration mounted on said arcuated substrate, wherein said reflector sub-system is operatively coupled to said diffraction radiation emanating from said physical object, wherein said diffraction radiation contains peaks of diffraction intensity corresponding to microstructure properties of a crystal structure of said printing material of said physical object, and wherein at said predetermined position of said reflector sub-system relative to said physical object, said peaks of diffraction intensity impinge on and are reflected from corresponding reflector crystals, a data acquisition sub-system operatively interacting with said reflector sub-system and configured for capturing the peaks of diffraction intensity reflected from said corresponding reflector crystals, and for producing output signals corresponding to said reflected peaks of diffraction radiation intensity, and, a computer sub-system operatively coupled to said data acquisition sub-system and configured to compute, in real-time, microstructure properties of said printing material of said physical object during the 3-D printing process based on said output signals.

2. The XRD system of claim 1, wherein said data acquisition sub-system includes at least one point detector operatively coupled to said corresponding reflector crystals.

3. The XRD system of claim 2, wherein said data acquisition sub-system further includes a source of at least one reference peak of diffraction intensity.

4. The XRD system of claim 3, wherein said source of a reference peak of diffraction intensity includes a background detector.

5. The XRD system of claim 3, wherein said computer sub-system is further configured to process said output signals of said acquisition sub-system to detect a deviation of the microstructure properties from said at least one reference peak of diffraction intensity, said deviation being indicative of a possible defect.

6. The XRD system of claim 5, wherein said computer sub-system is further configured to compute a ratio of at least one output signal from said output signals produced by said data acquisition sub-system, or a ratio of said at least one output signal to said at least one reference peak of diffraction intensity, thereby obtaining a crystal phase composition parameter of the printing material of at least one layer of said printing physical object.

7. The XRD system of claim 1, further comprising a scanning sub-system operatively coupled between said parallel incident X-ray beam and said physical object and configured to controllably change relative disposition therebetween during the 3-D printing process.

8. The XRD system of claim 7, wherein said computer sub-system is further configured to displace said reflector sub-system and said data acquisition sub-system in synchronism with said changing relative disposition between said parallel X-ray beam and said physical object.

9. The XRD system of claim 1, wherein said curved substrate of said reflector sub-system includes a cylindrically-contoured body, and wherein said array of reflector crystals is mounted on the inner surface of said cylindrically-contoured body.

10. The XRD system of claim 9, wherein each of said array of reflector crystals is shaped as a flat stripe disposed a predetermined distance from adjacent reflector crystals.

11. The XRD system of claim 10, wherein the radius R of said cylindrically-contoured substrate is determined by a diffraction angle $\theta$ of the printing material and the distance d between said reflector crystals of said reflector sub-system, and wherein a distance L of said cylinder contoured substrate from the physical object is determined in accordance with $\tan(2\theta)=R/L$.

12. The XRD system of claim 1, wherein the size of the parallel X-ray beam is adjusted between approximately 0.5 mm and 10 mm.

13. A method for real-time in-situ measurements of microstructure properties of an object during 3-D printing process, comprising the steps of:

producing a parallel X-ray beam;

varying the size of said parallel X-ray beam between 0.5 mm and 10 mm;

directing said parallel X-ray beam on a physical object manufactured in accordance with a 3-dimensional digital model by depositing a number of layers of a material in succession, wherein said parallel X-ray beam, upon impinging on said physical object, produces diffraction radiation directed away from said physical object;

positioning a reflector sub-system at a predetermined location relative to said physical object, and forming said reflector sub-system with a curved substrate of a predetermined shape and an array of reflector crystals of a predetermined configuration mounted on said curved substrate;

operatively aligning said reflector sub-system with said diffraction radiation emanating from said physical object, said diffraction radiation containing peaks of diffraction intensity corresponding to microstructure properties of a crystal structure of said physical object, wherein said peaks of diffraction intensity impinge on and are reflected from corresponding reflector crystals;

operatively coupling a data acquisition sub-system to said reflector sub-system and configuring said data acquisition sub-system for capturing thereat the peaks of diffraction intensity reflected from said corresponding reflector crystals, and producing output signals corresponding to said reflected peaks of diffraction radiation intensity; and operatively coupling a computer sub-system to said data acquisition sub-system, and computing in real-time, by said computer sub-system, microstructure properties of said printing material of said physical object during the 3-D printing process based on said output signals.

14. The method of claim 13, further comprising the step of:

processing, by said computer sub-system, said output signals of said acquisition sub-system to detect deviation of the microstructure properties from at least one reference peak of diffraction intensity, said deviation being indicative of a possible defect in said printing physical object.

15. The method of claim 13, further comprising the step of:

computing, by said computer sub-system, said output signals of said data acquisition sub-system, a ratio of output signals produced by said point detector of said data acquisition sub-system to obtain a crystal phase composition parameter of the printing material of at least one layer of said printing physical object.

16. The method of claim 13, further comprising the steps of:

controllably changing, by said computer sub-system, relative disposition between said X-ray beam and said printing physical object, and displacing said reflector sub-system and said data acquisition sub-system in synchronism with said changing relative disposition between said parallel X-ray beam and said physical object during the 3-D printing process.

17. A method for real-time in-situ measurements of microstructure properties of an object during 3-D printing process, comprising the steps of:

producing a parallel X-ray beam, directing said parallel X-ray beam on a physical object manufactured in accordance with a 3-dimensional digital model by depositing a number of layers of a material in succession, wherein said parallel X-ray beam, upon impinging on said physical object, produces diffraction radiation directed away from said physical object;

positioning a reflector sub-system at a predetermined location relative to said physical object, and forming said reflector sub-system with a curved substrate of a predetermined shape and an array of reflector crystals of a predetermined configuration mounted on said curved substrate;

operatively aligning said reflector sub-system with said diffraction radiation emanating from said physical object, said diffraction radiation containing peaks of diffraction intensity corresponding to microstructure properties of a crystal structure of said physical object, wherein said peaks of diffraction intensity impinge on and are reflected from corresponding reflector crystals;

operatively coupling a data acquisition sub-system to said reflector sub-system and configuring said data acquisition sub-system for capturing threat the peaks of diffraction intensity reflected from said corresponding reflector crystals, and producing output signals corresponding to said reflected peaks of diffraction radiation intensity;

operatively coupling a computer sub-system to said data acquisition sub-system, computing in real-time, by said computer sub-system, microstructure properties of said printing material of said physical object during the 3-D printing process based on said output signals; and, configuring said reflector sub-system with a cylindrically-contoured body having radius R, shaping each reflector crystal as a flat stripe, and mounting said array of reflector crystals on the inner surface of said cylindrically-contoured body, spaced-apart a distance d between adjacent reflector crystals.

18. The method of claim 17, further comprising the steps of:

determining the radius R of said cylindrically-contoured body by a diffraction angle $\theta$ of the printing material and the predetermined distance between said reflector crystals, and positioning said cylindrically contoured body a distance L from the physical object, said distance L being determined in accordance with $\tan(2\theta)=R/L$.

* * * * *